United States Patent
Surma et al.

(10) Patent No.: US 7,373,424 B2
(45) Date of Patent: May 13, 2008

(54) EXACTLY ONCE PROTOCOL FOR MESSAGE-BASED COLLABORATION

(75) Inventors: Peter Surma, Heidelberg (DE); Stefan Rossmanith, Walldorf (DE); Christoph Hofmann, Wiesloch (DE)

(73) Assignee: SAP AG, Walldorf (DE)

( * ) Notice: Subject to any disclaimer, the term of this patent is extended or adjusted under 35 U.S.C. 154(b) by 773 days.

(21) Appl. No.: 10/402,351

(22) Filed: Mar. 27, 2003

(65) Prior Publication Data

US 2003/0212690 A1 Nov. 13, 2003

Related U.S. Application Data

(60) Provisional application No. 60/369,119, filed on Mar. 28, 2002, now abandoned.

(51) Int. Cl.
| | |
|---|---|
| G06F 15/173 | (2006.01) |
| G06F 15/16 | (2006.01) |
| G06F 17/30 | (2006.01) |
| G06F 9/44 | (2006.01) |
| G06F 9/46 | (2006.01) |
| G06F 7/00 | (2006.01) |
| G06F 17/00 | (2006.01) |
| G06F 3/00 | (2006.01) |
| G06F 13/00 | (2006.01) |

(52) U.S. Cl. .................. 709/238; 709/204; 709/205; 709/230; 709/236; 707/6; 707/10; 707/104.1; 719/316

(58) Field of Classification Search ........ 709/204–207, 709/230, 236–238; 707/6, 10, 104.1; 719/316
See application file for complete search history.

(56) References Cited

U.S. PATENT DOCUMENTS

| | | | | |
|---|---|---|---|---|
| 6,810,431 | B1 * | 10/2004 | Narisi et al. ................ 709/250 |
| 6,826,606 | B2 * | 11/2004 | Freeman et al. ............ 709/223 |
| 7,000,012 | B2 * | 2/2006 | Moore et al. ............... 709/220 |
| 7,047,532 | B1 * | 5/2006 | Connelly .................... 719/310 |
| 7,068,654 | B1 * | 6/2006 | Joseph et al. ............... 370/392 |
| 7,076,556 | B1 * | 7/2006 | Brock et al. ................ 709/228 |
| 7,177,839 | B1 * | 2/2007 | Claxton et al. ............... 705/44 |
| 7,225,237 | B1 * | 5/2007 | Tenereillo .................... 709/219 |
| 7,249,157 | B2 * | 7/2007 | Stewart et al. .............. 709/204 |
| 2001/0056422 | A1 * | 12/2001 | Benedict et al. .............. 707/10 |

(Continued)

OTHER PUBLICATIONS

Silva, Mario J. and Katz, Randy H. "The Case for Design using the World Wide Web," Proceedings of the 32nd ACM/IEEE conference on Design Automation, 1995, pp. 579-585.*

(Continued)

Primary Examiner—Jason D Cardone
Assistant Examiner—Melvin H Pollack
(74) Attorney, Agent, or Firm—Mintz, Levin, Cohn, Ferris, Glovsky & Popeo, P.C.

(57) ABSTRACT

Methods and systems for reliably exchanging a message among collaborating applications are disclosed. The methods and systems utilize a central exchange infrastructure (XI) for executing collaborative business processes among heterogeneous applications. Reliable message transmission is guaranteed by an Exactly Once Protocol (EOP), in which a database associated with the messaging and transport layer (MTL) of an HTTP-compliant server is used for storing a message identifier and comparing the message identifier to previously received message identifiers. If there is no match, the XI facilitates an exchange of message content of application data from a sending application to a receiving application.

19 Claims, 8 Drawing Sheets

U.S. PATENT DOCUMENTS

| | | | |
|---|---|---|---|
| 2002/0019825 A1* | 2/2002 | Smiga et al. | 707/102 |
| 2002/0026520 A1* | 2/2002 | Mendiola et al. | 709/230 |
| 2002/0052968 A1* | 5/2002 | Bonefas et al. | 709/231 |
| 2002/0120761 A1* | 8/2002 | Berg | 709/230 |
| 2002/0156927 A1* | 10/2002 | Boucher et al. | 709/250 |
| 2002/0194180 A1* | 12/2002 | Alsop et al. | 707/10 |
| 2002/0198994 A1* | 12/2002 | Patton et al. | 709/225 |
| 2003/0046416 A1* | 3/2003 | Heuer | 709/232 |
| 2003/0177252 A1* | 9/2003 | Krichevski et al. | 709/230 |

OTHER PUBLICATIONS

Ravindran, K. et al. "Reliable Client-Server Communication in Distributed Programs," Proceedings 14th Conference on Local Computer Networks, Oct. 10-12, 1989, pp. 242-251.*

Ravindran, K. and Lin, X.T. "Structural Complexity and Execution Efficiency of Distributed Application Protocols," Applications, Technologies, Architectures, and Protocols for Computer Communication, 1993, pp. 160-169.*

Rescorla, E. "HTTP Over TLS," RFC 2818, May 2000, pp. 1-7.*

Hoffman, P. "SMTP Service Extension for Secure SMTP over Transport Layer Security," RFC 3207, Feb. 2002, pp. 1-9.*

Ong, L. and Yoakum, J. "An Introduction to the Stream Control Transmission Protocol (SCTP)," RFC 3286, May 2002, pp. 1-10.*

Schutt, T.E. et al. "Message-Handling Systems Based on the CCITT X.400 Recommendations," IBM Systems Journal, vol. 26, No. 3, 1987, pp. 235-254.*

Kang, Tae-Gun, et al. "Design of Connection Management Module for MOM," 2nd International Symposium on Parallel and Distributed Computing, Oct. 13-14, 2003, pp. 123-130.*

Peersman, G. et al. "A Tutorial Overview of the Short Message Service Within GSM," Computing and Control Engineering Journal, vol. 11, Issue 2, Apr. 2000, pp. 79-89.*

Hodges, J. et al. "Lightweight Directory Access Protocol (v3): Extension for Transport Layer Security," RFC 2830, May 2000, pp. 1-12.*

* cited by examiner

EXACTLY ONCE PROTOCOL FOR MESSAGE-BASED COLLABORATION

CROSS REFERENCE TO RELATED APPLICATIONS

This application claims priority to U.S. Provisional Patent Application No. 60/369,119, filed on Mar. 28, 2002 now abandoned.

TECHNICAL FIELD

The following description relates to an exchange infrastructure and a system and method for message-based coupling of a collection of software components.

BACKGROUND

Software components that are designed to perform a certain function are known as applications. Applications are widely used in a variety of business processes, and are increasingly used in collaborative situations, i.e. situations in which one or more applications receive data from another application.

Applications in a collaborative environment frequently update their data and transmit data to collaborating applications, which are triggered by an incoming message to update their own data with the contents of the message. Application data updates are typically of considerable relevance in a business scenario or process. Accordingly, three natural requirements have arisen for collaborative data exchanges: 1) application data is stored in a persistent medium, typically a relational database system; 2) data updates within applications and the message transport processes that move data must be reliably integrated; and 3) the message transport process itself must be reliable.

SUMMARY

This document discloses a message exchange protocol run by integration servers and integration engines of an exchange infrastructure (XI). This protocol is used in exchange infrastructure in two Quality-Of-Service (QOS) modes: Exactly Once (EO) and Exactly Once In Order (EOIO). The message exchange protocol for the exchange infrastructure is hereafter referred to simply as the "EO protocol". Application data updates and the message transport process are made reliable by binding them into one hypertext transport protocol (HTTP)-based database transaction.

The EO protocol includes a local part (i.e. two parts: from the sending application to the exchange infrastructure middleware; and from the exchange infrastructure middleware to the receiving application) and a remote part (i.e. from the sending middleware to receiving middleware in the exchange infrastructure). The local protocol ensures that application data are converted to transportable middleware messages with a unique ID (and vice versa) in a transactional manner, that is, both the middleware and application are in a consistent state for the duration of the message exchange process.

The remote transport protocol ensures the secure transmission of message data and message identification (MsgID) pairs from one point in the exchange infrastructure to another. At the core of the remote protocol lies the XI's reliable message transfer across HTTP, which is based on a send-resend-confirm mechanism with duplicate recognition. i.e. transmission failure is automatically and explicitly handled (and repaired). Duplicate messages are recognized and discarded. Optionally, a final message ID discard step may be implemented as part of the overall protocol.

A method of reliably transporting a message from a sending application to a receiving application is disclosed. In one aspect, the method includes storing the message in a database associated with the sending application. The message includes application data and a message identifier (ID). The method further includes transmitting an HTTP request to the receiving application, where the HTTP request includes the message ID, and determining whether the message ID matches a message ID previously stored in a database associated with the receiving application. If the message ID does not match the message ID previously stored in the database associated with the receiving application, transmitting the application data from the database associated with the sending application to the database associated with the receiving application. If the message ID matches the message ID previously stored in the database associated with the receiving application, transmitting a request to the sending application to not send the application data from the database associated with the sending application.

In another aspect, the method includes determining a least one receiving application based on routing rules accessed from a directory and associated with the application data. The method further includes transmitting a HTTP request to the at least one receiving application, and determining whether the message ID matches a message ID previously stored in a database associated with the receiving application.

BRIEF DESCRIPTION OF THE DRAWINGS

These and other aspects will now be described in detail with reference to the following drawings.

DETAILED DESCRIPTION

The systems and techniques described here relate to a message exchange protocol for reliably communicating data between applications in a heterogeneous system landscape. The protocol is optimally implemented in an exchange infrastructure configured to integrate and drive collaboration between various applications in the landscape using open standards and transport protocols such as HTTP.

Figure 1:
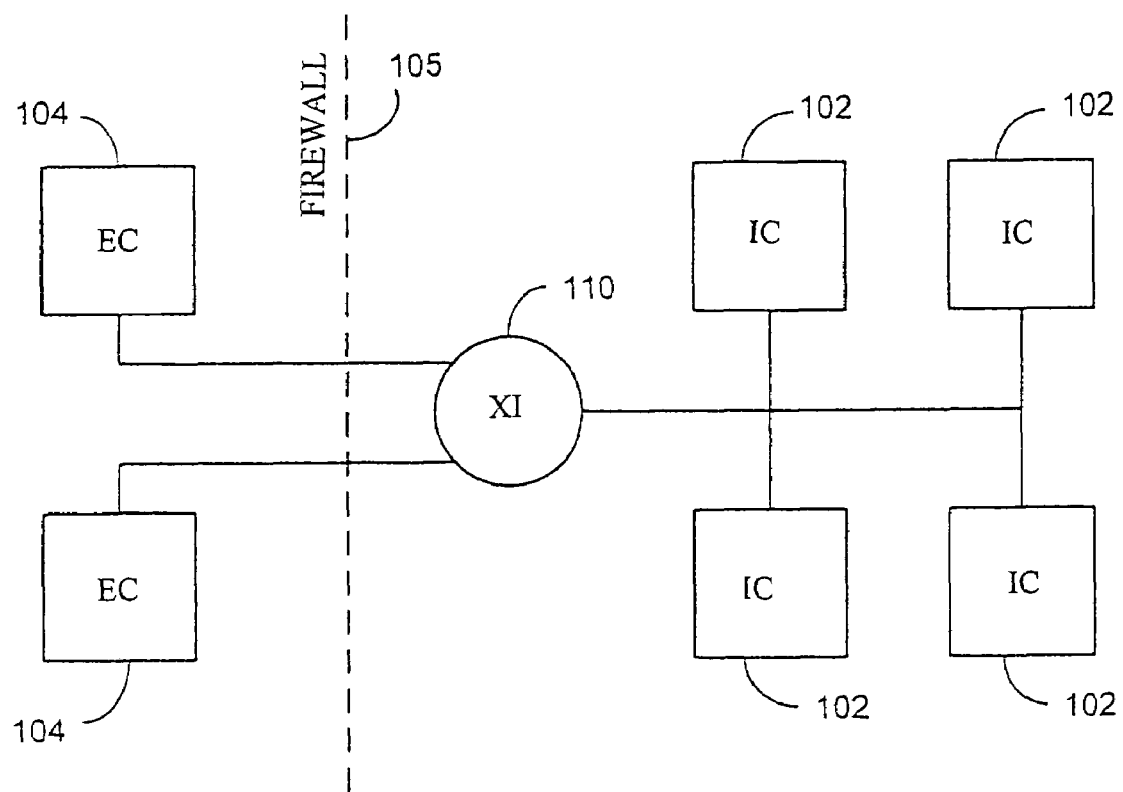
FIG. 1 is a simplified block diagram of an exchange system for integrated, message-based collaboration.

FIG. 1 is a simplified block diagram of a system 100 for integration and "loose coupling" (i.e. message-based interaction) of applications. The system 100 includes an exchange infrastructure (XI) 110 for collaborative processing among internal components (ICs) 102 of an enterprise, and between external components (ECs) 104 that communicate to one or more ICs 102 through a firewall 105. The ICs and ECs 102 and 104 represent any of a number of processes or services and their software and hardware, such as Web portals, buying or selling programs, electronic mail, business management programs, project planning programs, etc., and are preferably Web-based applications. Each of the ICs/ECs 102, 104 communicates via messaging with one or more other components according to at least one of a number of communication protocols or standards.

The XI 110 is a self-contained, modularized exchange platform for driving collaboration among the components 102, 104. The XI 110 includes a central integration repository and directory storing shared collaboration knowledge. The XI 110 supports open standards such as various standard markup languages like the extensible markup language (XML), web service description language (WSDL), and simple object access protocol (SOAP) to provide an abstraction of technical interfaces for the components 102, 104, and for message-based communications across heterogeneous component interfaces. The self-contained, modularized functions of the XI 110 can be provided as one or more Web services based on standard Internet technology, and therefore can be published, discovered, and accessed within a network of components 102, 104 using open standards.

Figure 2:
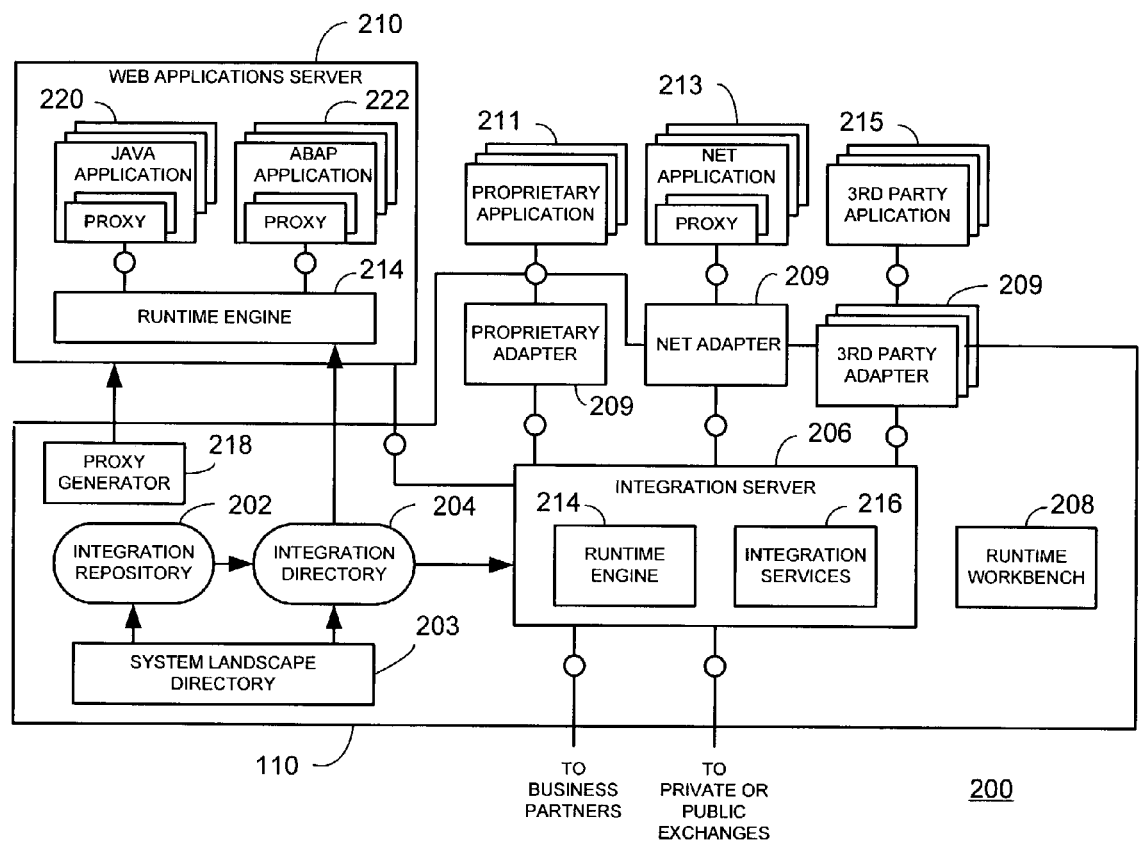
FIG. 2 is a block diagram of an exchange infrastructure.

FIG. 2 illustrates a system landscape 200 including an XI 110 for facilitating message-based collaboration among applications. The exchange infrastructure 110 includes an integration repository 202, an integration directory 204, a system landscape directory 203, and an integration server 206. The integration repository 202 captures design-time collaboration descriptions of all software components that can communicate via the XI 110. The integration directory 204 captures configuration-specific collaboration descriptions of the system landscape 200 at runtime, which includes accessing actual component installations from the system landscape directory 203 and connectivity descriptions for external components, all of which represents the shared business semantics of the system landscape 200. The integration server 206 uses the shared business semantics at runtime to execute message-based collaboration among the active software components.

The integration server 206 includes a runtime engine 214 that provides messaging and business process control at runtime for connecting services and managing the process flow of value chains. The integration server 206 also includes integration services 216 that typically require an application-specific implementation. Like the integration repository 202 and integration directory 204, the integration server 206 is configured for deployment within any existing system infrastructure. The integration server 206 is preferably a dedicated server that applies the shared collaboration knowledge of the integration directory 204 of the supported system landscape in a runtime collaboration environment. A runtime workbench 208 allows organizations or users to manage the reliable operation of the XI 110.

The XI 110 also includes various adapters 209 that provide connectivity between the integration server 206 and proprietary applications 211, Web-based services 213, and third party applications 215. The XI 110 can also include Web applications server 210 that provides Web-based applications programmed according to standard computing platforms using web-specific programming languages such as Java and ABAP, for instance. The Web applications server 210 also includes an instance of the runtime engine 214 for providing messaging and business process control between Web-based applications such as Java applications 220 and ABAP applications 222, and other components.

New interfaces for software components can be defined using an application component employing a proxy, which allows the interface for the software component to be implemented locally in the XI 110. Proxies make the communication technology stack transparent to applications, and present an application with a programming language-dependent interface. The proxies can be generated by a proxy generator 218 based on information stored on the integration repository 202. The proxy generator 218 uses the interface information described via a standard Web-based language such as WSDL and XSDL to create platform- and programming language-dependent code in the application development system. The communication logic can be implemented based on the proxy that represents the interface description of the respective development platform, such as Java, ABAP, and .NET for the web-based applications 213. The proxies convert platform-specific data types into XML and provide access to the component-specific local integration engine. On the outbound side, proxies are generated completely. Outbound proxies can be called via a service invocation provided by an application's developer. On the inbound side, only proxy skeletons need to be generated, as implemented by the receiving application.

Figure 3:
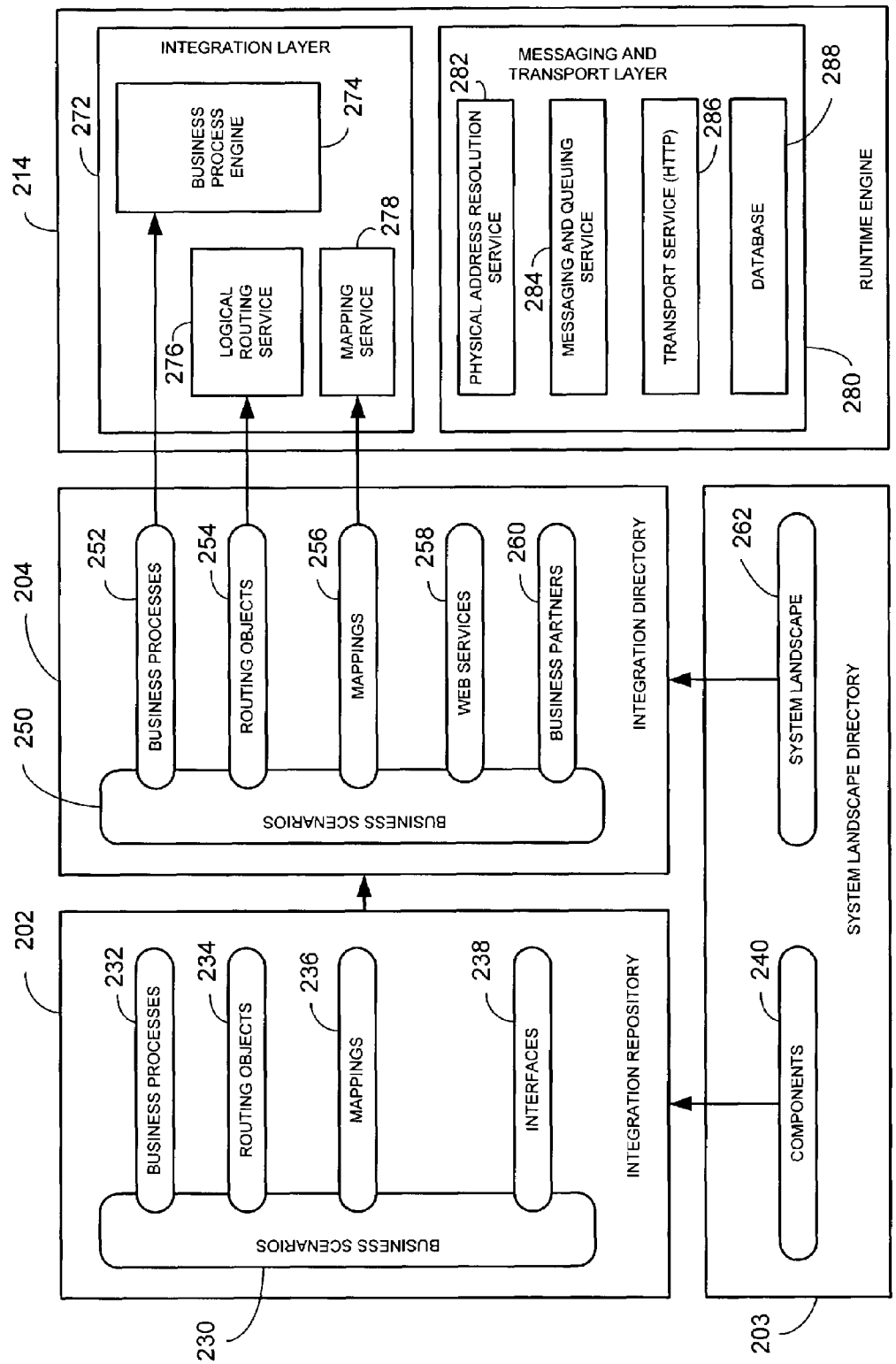
FIG. 3 is a detailed block diagram of an integration repository, integration directory, and runtime engine for collaborative processing.

FIG. 3 illustrates the integration repository 202, the system landscape directory 203, the integration directory 204 and an instantiation of the runtime engine 214 in greater detail. The integration repository 202 includes design-time business processes 232, routing objects 234, mappings 236, and interfaces 238, all of which are defined according to one or more business scenarios 230. The integration repository 202 accesses descriptions of all software components 240 in the system landscape from the system landscape directory 203. The business scenarios 230 of the integration repository 202 describe and configure message-based interaction between application components or enterprises. An enterprise can select one or more business scenarios described in the integration repository 202 as a best practice for rapid configuration of the XI 110.

The business processes 232 can be implemented as extensible compound Web services executed using a business process engine 274. Each business process 232 is modeled centrally in the integration repository 202, and can defined to the detail of user interaction steps. A company or user designs each business process 232 according to its business needs, independently of the technical implementation. There may be several categories of business process templates: i.e. generic business processes, industry-specific processes, and company-specific processes, for example. Each process identifies the Web services that are needed and that must be interconnected. In one specific implementation, business processes 232 are defined using a graphical interface, and then stored in a standardized format like Business Process Modeling Language (BPML). The business process engine can then interpret these models and execute them to drive collaboration among software components.

Routing objects 234 are predefined criteria to determine potential receivers of messages that must be distributed between components and business partners during collaborative processing. Information about the routing objects is used for receiver determination to avoid having to process a complete message before distribution. Mappings 236 define required transformations between message interfaces 238, message types, or data types in the integration repository 202. These transformations cover structural conversions and value mappings. Structural conversions are used for semantically equivalent types that are syntactically or structurally different, whereas value mapping may be used when an object is identified by different keys in multiple systems. In a specific implementation, a graphical mapping tool is provided to assist in mapping, and transforming data is based on the Extensible Stylesheet Language Transformation (XSLT) or Java code.

The integration repository 202 is the central point of entry for interface development, storage and retrieval, and includes interfaces 238 that describe all message interfaces of all software components in the system landscape. Accordingly, the interfaces 238 can be implemented on any software component using any technology. In one implementation, the interfaces 238 are based on WSDL. Message interfaces are made up of message types, which are in turn made up of data types. The data types can be described using XML Schema Definition Language (XSDL). An example of a data type is "address," which is used in the message type "Create PO" and can be reused for the message type "Create Invoice." Interfaces 238 can be arranged according to any classification, such as inbound and outbound, or synchronous and asynchronous.

The components 240 represent component descriptions that include information about application components, as well as information relating to their dependencies on each other. In a specific implementation, the component descriptions are based on the standard Common Information Model (CIM) of the Distributed Management Taskforce. Since the integration repository 202 includes design-time information, only component-type information, independent of actual installation, is stored as components 240 in the system landscape directory 203. The component descriptions can be added using an API or interactively using a graphical user interface.

The integration directory 204 details information from the integration repository 202 that is specific to the configuration of each component as installed in the system. The configuration-specific collaboration descriptions of the integration directory 204 can be generated automatically from content in the integration repository 202 or manually by a user using a graphical user interface. In one implementation, the integration directory 204 is built on a Java platform and its content is represented via XML using open Internet standards. The integration repository 202 can be upgraded without affecting the integration directory 204 or any runtime collaborative processes. The user then decides which changes should be transferred to the integration directory 204, either as predetermined automatic upgrades or manually via graphical tools.

The integration directory 204 includes configuration-specific descriptions of business scenarios 250, business processes 252, routing rules 254, and executable mappings 256. The integration directory 204 also includes descriptions of active Web services 258, and active business partners 260. The integration directory 204 uses a description of the active system landscape 262 from the system landscape directory 203. The business scenarios 250 in the integration directory 204 represent the overall view of the interaction among interfaces and mappings 256 in the context of the actual configuration relevant for the specific implementation. The business processes 252 represents an executable description of all active business processes.

The routing rules 254 determine the receivers of a message on a business level. In one specific implementation, the content of a message is used as a routing rule 254. Other parameters may also be used. Relevant input parameters include the sender, the sender message type, the message to identify the receivers, and the receiver message type. The routing rules 254 can be described declaratively using XML Path Language (Xpath, i.e. by using a graphical tool) or can be coded in Java. The integration engine 214 at runtime accesses information on the routing rules 254.

The routing rules 254 may use logical terms to describe senders and receivers in order to separate them from the physical address provided by the Web services 258 described in the integration directory 204. The physical address can therefore be changed without changing business-oriented content. Mappings 256 in the integration directory 204 represent mappings required in the active system landscape, in contrast to the integration repository mappings 236 that contains all supported mappings. Some new entries however, such as a new sequence of mappings, can be made only in the integration directory 204 to address additional Web services for mapping, for example. The integration engine 214 accesses the integration directory mappings 256 at runtime.

Web services 258 describe interfaces implemented within the current active system landscape, as well as active Web services supported by described business partners 260. As such, information describing Web services 258 can be exchanged with UDDI-compatible directories or added manually. Each Web service 258 description also provides physical addressing details, access information, and other special attributes such as uniform resource locator (URL), protocol, and security information. In one implementation, the Web services 258 are described in WSDL, and SOAP and ebXML are used as messaging protocols. The integration engine 214 accesses information about the Web services 258 at runtime as well.

The system landscape 262 of the system landscape directory 203 describes the current system landscape that uses the XI 110. The system landscape 262 describes which components are installed and available on certain machines within the system, which instance or client was chosen, further information on the installed components, other system landscapes, and so on. The system landscape 262 description is based on an open architecture and can adhere to any widely accepted standard such as CIM. Thus, many proprietary and third party components can be configured to automatically register themselves in the system landscape 262 upon being installed within the actual system landscape. Access interfaces to the system landscape 262 description can be based on open standards as well, such as the Web-based Enterprise Management (WBEM) and SOAP standards.

Business partners 262 defines information for business partners of an enterprise, such as names, addresses, and URLs, but may also contain more detailed and sophisticated information. For instance, the business partners 262 may include a description of the message formats that can be directly received and processed, or of security protocols used for safe communications, or trading terms that are employed in the partnership. The kind of information stored in business partners 262 can be governed by enterprise-specific decisions of the enterprise using the XI 110.

The integration directory 204 and the runtime engine 214 form a collaborative runtime environment for executing collaborative business processes. The collaborative runtime environment provides all runtime components relevant for exchanging messages among the connected software components and business partners. The integration server 206 executes the collaborative runtime environment or Web application server 210, either of which can include an instance of the runtime engine 214 in accordance with informational resources provided by the integration directory 204.

The runtime engine 214, which exchanges all messages between the various interconnected components, includes two layers: an integration layer 272 and a messaging and transport layer (MTL) 280. The integration layer 272 includes a business process engine 274 executing centrally modeled business processes, a logical routing service 276 and a mapping service 278. The MTL 280 provides a physical address resolution service 282, a messaging and queuing service 284, a transport service 286 via HTTP, and a database 288. The integration services 216 in the integration server 206 can support the runtime engine 214. An MTL 280 is also included in each instantiation of the runtime engine 214 in Web applications servers 210, as well as in each adapter 209 of the adapter framework connecting to various software components. Each MTL 280 has a role in the execution of the EO protocol, as will be explained further below.

At runtime, business processes 252 are instantiated and executed by the business process engine 274, which executes the respective Web services described in Web services 258 independent of their location according to the business process model. The business process engine 274 is independent of the semantics of the executed business processes 252, and is configured as a mediator and facilitator for business processes 252 to interact with technical components of the runtime system landscape.

Figure 4:
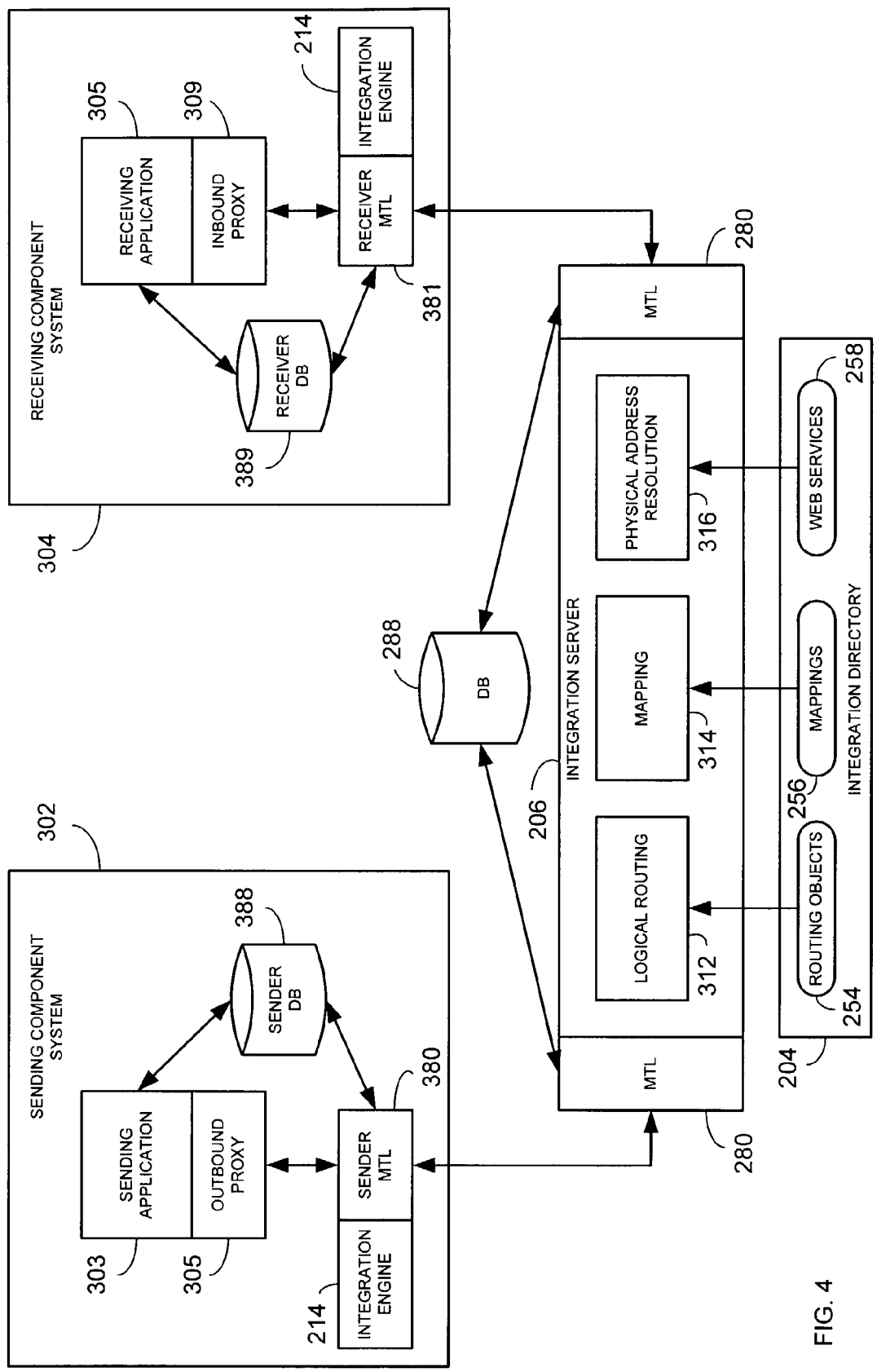
FIG. 4 is a block diagram of system for transmitting a message according to a reliable Exactly Once Protocol (EOP).

FIG. 4 is a block diagram illustrating a message exchange process. A sending application 303 resides in a sending component system 302, which represents the hardware and software platform of the sending application 303. One or more receiving applications 305 each reside in a receiving component system 304. A communication path for a message can include an outbound proxy 305 at the outbound interface of the sending application, and an inbound proxy 309 at the inbound interface of the receiving application 305. The sending application 303 uses a sender MTL 380 connected with an integration engine 214, preferably instantiated in a server such as the Web application server 210 shown in FIG. 2. The sender MTL 380 handles the message exchange according to the EO protocol for the sending application 303. Likewise, the receiving application 305 uses a receiver MTL 381 for the message exchange process executed according to the EO protocol. The receiver MTL 381 used by the receiving application 305 is also preferably executed with the integration engine 214 in a server such as a Web application server 210. Either the MTLs 380/381 or the sending/receiving applications 303/305 can store and/or access message data from a database 388, 389.

The configuration and connectivity shown for the sending and receiving applications is but one example only, and it should be noted that such configuration and connectivity could take any number of forms. The pictured example illustrates both asynchronous and synchronous communication. In synchronous communication, routing and physical address resolution is only needed for the request as the response is transferred to the sender, which is already known.

The MTLs 380/381 exchange messages with the MTL 280 in the integration server 206. The MTL 280 handles HTTP messaging, queuing and transport services for the message, while the integration server 206 also handles logical routing 312, mapping 314, and receiving application physical address resolution 316. The MTL 280 can store and/or access message data from a database 288.

With reference also to FIG. 3, for a given a message the logical routing service 276 uses information on the sending application and the message interface to determine receivers and required interfaces by evaluating the corresponding routing rules, as shown at 312. The routing rules are part of the configuration-specific descriptions of the runtime system landscape provided by the routing objects 254 of the integration directory 204, and can be implemented as Xpath expressions or Java code. The mapping service 278 determines the required transformations that depend on message, sender, and sender interface, as well as the receiver and receiver interface, at 314, from mappings 256 in the integration directory 204. In the case of asynchronous communication, even the message direction is determined to appropriately transform input, output, and fault messages.

After retrieving the required mapping from the integration directory 204, the mapping service 278 can either execute XSLT mappings or Java code (or any combination in a given sequence) to the content of the sent message. Below the integration layer 272, the MTL 280 moves the message to the intended or required receiver(s) according to the EO protocol. After the message is transformed into the format expected by each receiver, the physical address of the required receiver service and other relevant attributes are retrieved from the Web services 258 of the integration directory 204, and mapped to the message at 316. The order of these steps as described are exemplary only, and not to be construed as limiting in any way.

In the MTL 280, the messaging and queuing service 284 stores ingoing, outgoing, erroneous, and work-in-progress messages in the database 288. The MTL 280 in the integration server 206 provides queuing functions for the physical decoupling of application components and guarantees messages are delivered exactly once according to the EO protocol. The transport service 286 enables the integration server 206, via the runtime engine 214, to act as both an HTTP client and server. The transport service 286 of the MTL 280 implements both an HTTP client that enables outbound communication, and an HTTP server that handles inbound communication by accepting incoming messages. Additional server functions can address situations in which the receiver has no HTTP server by supporting polling over HTTP.

The EO protocol (EOP) is an asynchronous protocol based on the exchange of messages, i.e. the runtime of the sending program context of the sending application 303 is completely decoupled from the receiving program context of the receiving application 305. The underlying low-level transport protocol is the synchronous HTTP protocol, however. Both sending and receiving applications must have local runtime access to a database, such as the database 288 with the MTL 280, or databases 388 or 389 with MTL 380. It should be noted that each of these databases could be hosted on a single platform, or on separate platforms. The same database connection may be used to hold application data. The EOP utilizes the database to store various information, including Message Identification (MsgId), Message data, and Message status.

Figure 5:
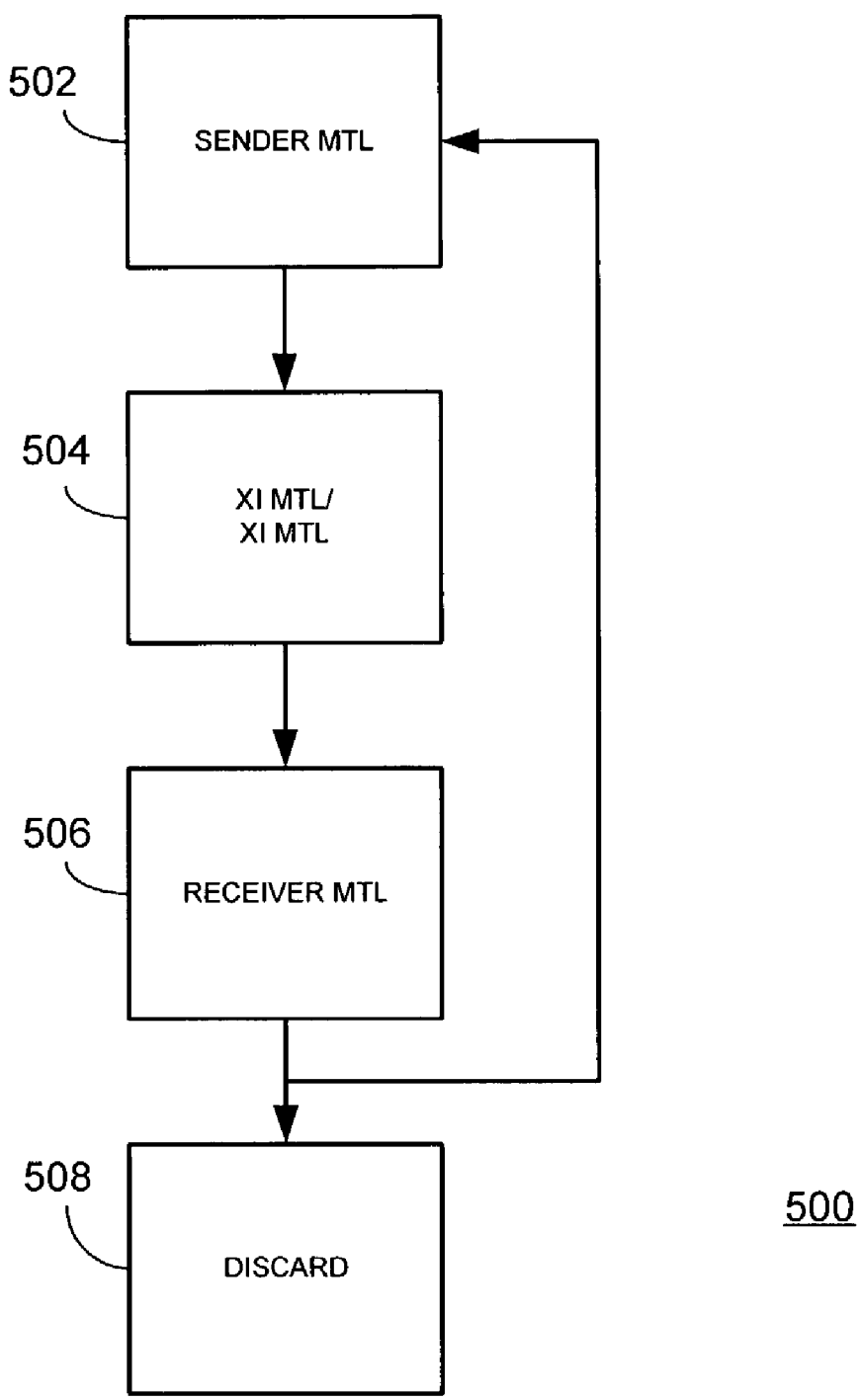
FIG. 5 is a flowchart of the main cycles of the EOP.

The communication from one application to the other through EOP runs through three required cycles, illustrated in the flowchart of FIG. 5: Sender MTL cycle 502, XI MTL/XI MTL cycle 504, and Receiver MTL cycle 506. A fourth, optional cycle is a Discard cycle 508. Each of these cycles will be now be described in detail below, with reference also to the system shown in FIG. 4.

Sender MTL Cycle

Figure 6:
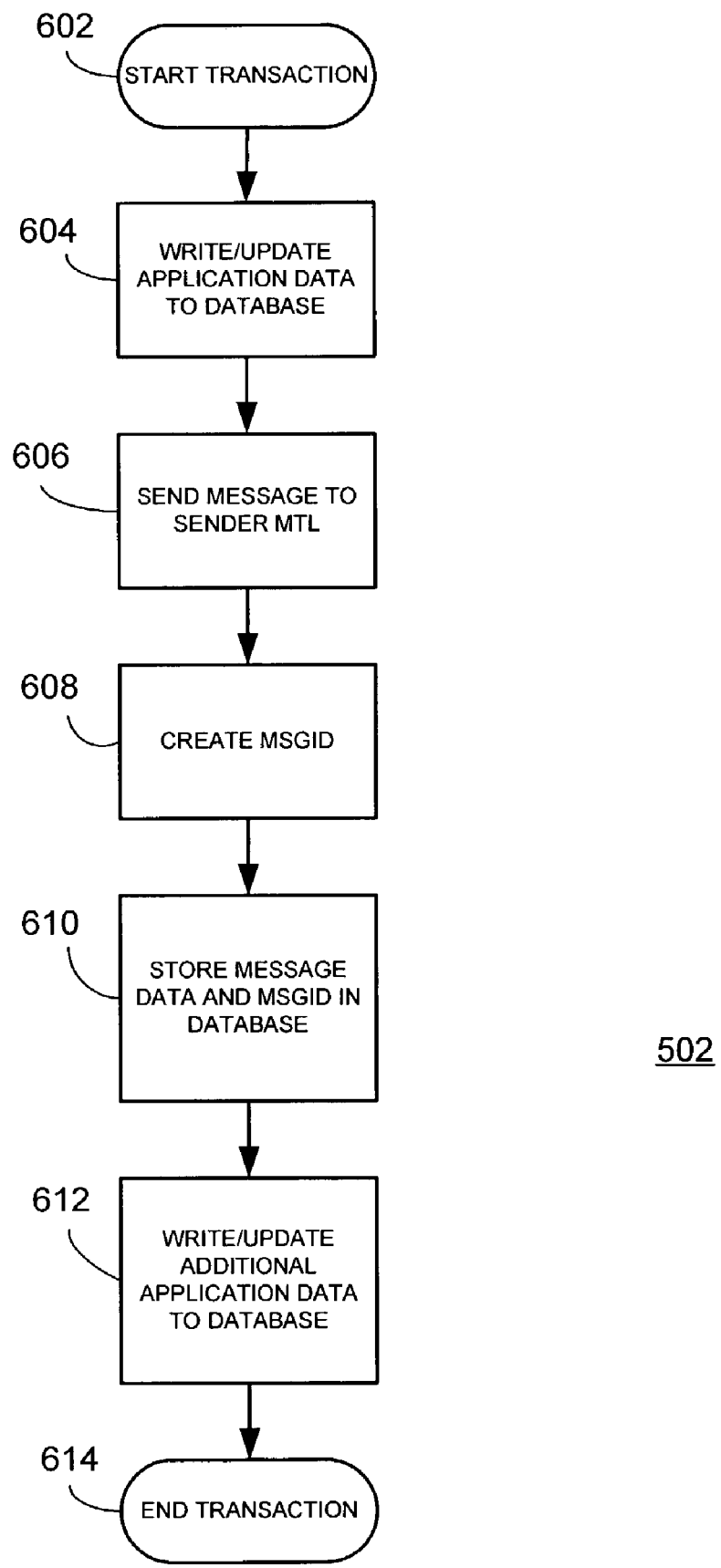
FIG. 6 is a flowchart of a transaction for preparing application data from a sending application according to the EOP.

The sender MTL cycle is responsible for entering application data transactionally from a sending application 303 into the sender MTL 380 exactly once. The following protocol is run locally at the sending application 303, as shown in FIG. 6:

The sending application 303 begins the cycle at 602 by starting a transaction on the sender database 388. The sending application 303 may write or update its own application data on the sender database 388, at 604. The sending application 303 then hands over the message data to the sender MTL 380 at 606. At 608, the sender MTL 380 creates a message identification (abbreviation: MsgId), which may be a global unique identifier (GUID). The sender MTL 380 stores message data together with the MsgId in an EOP-specific section of the sender database 388 at 610.

The sending application 303 may write or update additional application data on the database at 612 (in addition to the data written in step 604). The sending application 303 finalizes the cycle by committing (ending) the transaction at step 614. As a result, both application data and EOP-data enter the sender database 388 in an atomic transaction. i.e. either both types of data or neither type of data enters the sender database 388.

XI MTL/XI MTL Cycle

Figure 7:
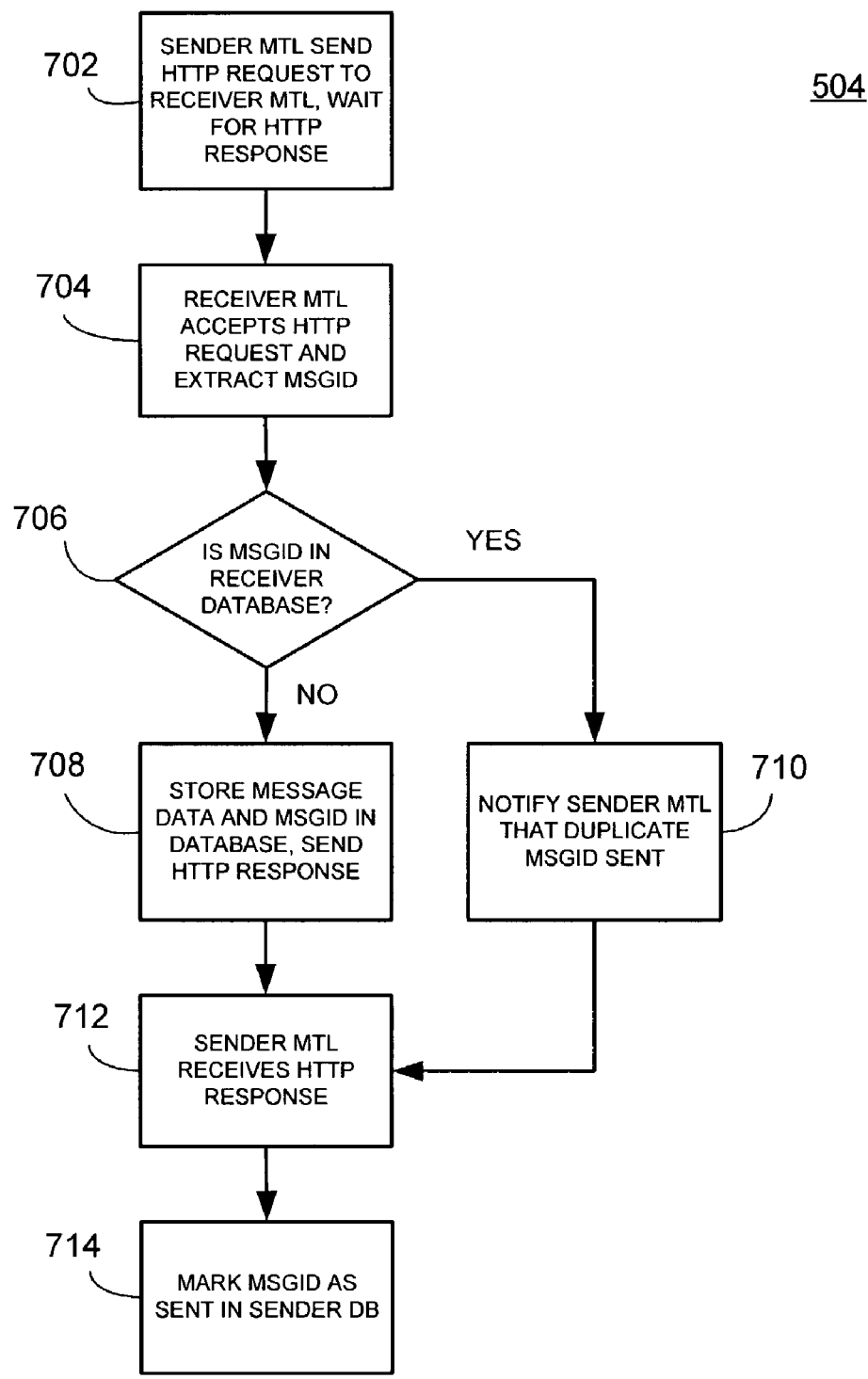
FIG. 7 is a flowchart of a process for reliably transmitting application data from a sending application to a receiving application.

The XI MTL/XI MTL cycle 504 is responsible for reliably (exactly once) transmitting application data from the program instance of the sending application 303 to the program instance of the receiving application 305. The following protocol is run on the integration server 206 of the XI between the sender MTL 380 and the receiver MTL 381, as shown in FIG. 7:

The sender MTL 380 sends an HTTP-request to the receiver MTL 381 at step 702. The payload of the HTTP call includes the MsgId and a representation of the application data (as written in the sender MTL cycle 502). As part of the synchronous HTTP protocol, the sender MTL 380 waits for the HTTP response to come back. The receiver MTL 381 accepts the HTTP-request and extracts both the MsgId and the application data from the HTTP payload at 704. The receiver MTL 381 checks if the MsgId already exists in the local receiver database 389, at 706.

If MsgId does not exist yet in the receiver database 389, the receiver MTL 381 stores the MsgId and the message are stored in the local EOP database, and sends back the HTTP response, informing the sender MTL 380 that the transmission has succeeded (abbreviated: "EOP transmission-OK"), at step 708. If MsgId exists, at 710 the receiver MTL 381 informs the sender MTL 380 that a duplicate MsgId was sent and that the sending application 303 should stop resending this message. The sender MTL 380 receives the HTTP response at 712, waking up from its waiting step of 702. The sender marks the MsgId as sent in the EOP database, and commits this change on the EOP database, at 714.

In error situations, the sender MTL 380 may never get notice of the success of the transmission. This may be due to two principally different situations. First, the error occurred before the MsgId and message data have been transactionally committed to the receiver database 389. Alternatively, the error occurred after the MsgId and message data have been transactionally committed to the receiver database 389. Transmission errors of both of these types can be handled by the EOP via a resend mechanism. If the sender MTL 380 does not receive the HTTP response (i.e. EOP transmission-okay), it resends the MsgId and corresponding message data again via HTTP (as described in step 702 above). The receiver-side mechanism of duplicate recognition described above (step 710) ensures that messages are never accepted more than once according to the EOP. On the other hand, the resend mechanism ensures that the message is sent from the sending to the receiver MTL 381 at least once. As a result, the transmission of the message is processed exactly once, according to the EOP.

Receiver MTL Cycle

Figure 8:
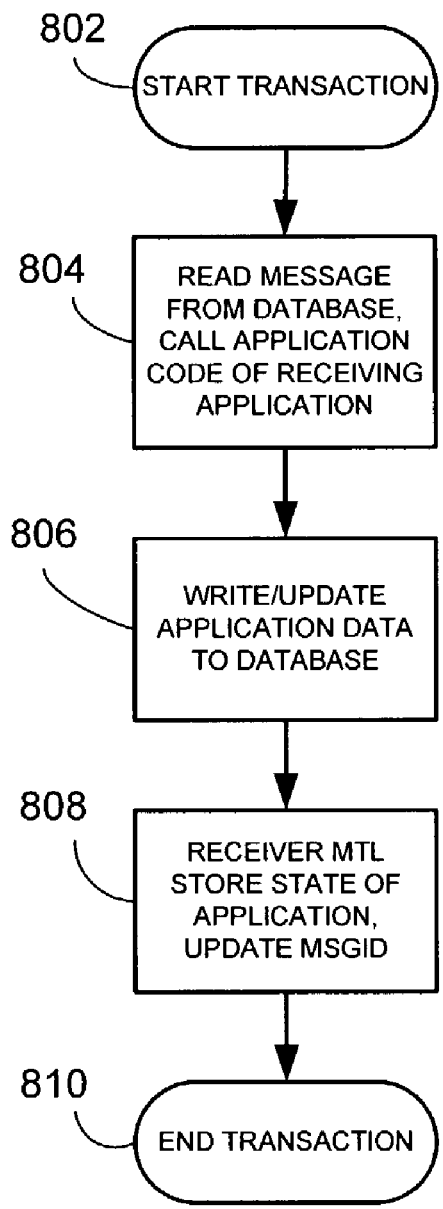
FIG. 8 is a flowchart of a transaction for storing application data at a receiving application according to the EOP.

The receiver MTL cycle 506 is responsible for calling the target receiving application 305 with the appropriate data, sent by the sending application 303, exactly once. The following protocol is run, as shown in FIG. 8:

The receiver MTL 381 begins the cycle by starting a transaction on the receiver database 389 at 802. The receiver MTL 381 reads the message data from the receiver database 389 and calls the application code of the receiving application 305 at 804. Based on the message data that are sent into it, the receiving application 305 may write or update its own application data on the receiver database 389 at 806. The receiving application 305 may return a notification about the success or failure of the application code to the receiver MTL 381. The receiver MTL 381 may store the state of the application (success or failure) inside the receiver database 389, at 808, and updates the state MsgId to a processed status. The receiver MTL 381 finalizes the cycle by committing (ending) the transaction started in step 502.

Discard Cycle

The detection of MsgId duplicates requires that the message identifications that have already been received must be held in the receiver database 389 indefinitely. For practical reasons, however, it is clear that at some point in time a given MsgId must be deleted in order to free database space for new messages. The timeout time (when old MsgIds are deleted on the receiver side) may be set to a very high value in order to achieve maximal protocol reliability. However, in order to secure the EOP against message duplicates after a possible MsgId deletion on the receiver side, an additional cycle can be run between sender- and receiver-side MTLs as follows:

If a message has been sent to the receiver MTL 381 successfully, the sender-MTL 380 may send a notification to the receiver MTL 381 stating that a specified MsgId will never be sent again. Upon receiving the notification, the receiver MTL 381 may delete the specified MsgId from its database 389. The sender MTL 380 should never resend the specified MsgId anymore, and should delete the specified MsgId from its database 388.

Although a few embodiments have been described in detail above, other modifications are possible. Other embodiments may be within the scope of the following claims.

The invention claimed is:

1. A method of reliably transporting a message from a sending application to a receiving application in a collaborative network, the method comprising:

storing the message in a database associated with the sending application, wherein the message includes application data and a message identifier (ID) uniquely identifying the message;

transmitting a hypertext transport protocol (HTTP) request to the receiving application, wherein the HTTP request includes the message ID;

determining whether the message ID matches a message ID previously stored in a database associated with the receiving application;

if the message ID does not match the message ID previously stored in the database associated with the receiving application, transmitting the application data from the database associated with the sending application to the database associated with the receiving application; and sending the message from the sending application to the receiving application using a first cycle including a first messaging and transport layer (MTL) at the sending application, using a second cycle at an integration server, coupled between the sending application and the receiving application, the second cycle including a second messaging and transport layer, and a third cycle including a third messaging and transport layer, each of the first, second, and third messaging and transport layers including a message queue, a physical address resolution, a database for storing the message identifier, and a transport mechanism for the HTTP request.

2. The method of claim 1, further comprising, if the message ID matches the message ID previously stored in the database associated with the receiving application, transmitting a request to the sending application to not send the application data from the database associated with the sending application.

3. The method of claim 1, wherein the receiving application is a web application hosted by a server, and wherein the database associated with the sending application is associated with the messaging and transport layer (MTL) of the server.

4. The method of claim 1, further comprising:
determining a logical receiving application of the message based on routing rules defined according to a directory of message interface descriptions associated with the message; and
mapping an outbound interface description associated with the sending application to an inbound interface description associated with the receiving application.

5. The method of claim 4, further comprising:
determining a physical address associated with the receiving application; and
sending the HTTP request to the physical address associated with the receiving application.

6. The method of claim 1, further comprising:
receiving the application data from the database associated with the sending application;
storing the application data in the database associated with the receiving application; and
associating the application data with the message ID transmitted with the HTTP request.

7. The method of claim 6, further comprising executing the receiving application with the application data from the database associated with the receiving application.

8. The method of claim 6, further comprising transmitting an HTTP response from the receiving application to the sending application.

9. The method of claim 8, wherein the HTTP response includes a message transmission status.

10. A method of reliably transporting a message from a sending application in a collaborative network, wherein the message includes application data and a message identifier (ID) uniquely identifying the message, the method comprising:
determining a least one receiving application based on routing rules accessed from a directory and associated with the application data;
transmitting a hypertext transport protocol (HTTP) request to the at least one receiving application, wherein the HTTP request includes the message ID;

determining whether the message ID matches a message ID previously stored in a database associated with the receiving; and sending the message from the sending application to the receiving application using a first cycle including a first messaging and transport layer (MTL) at the sending application, using a second cycle at an integration server, coupled between the sending application and the receiving application, the second cycle including a second messaging and transport layer, and a third cycle including a third messaging and transport layer, each of the first, second, and third messaging and transport layers including a message queue, a physical address resolution, a database for storing the message identifier, and a transport mechanism for the HTTP request.

11. The method of claim 10, further comprising, if the message ID does not match the message ID previously stored in the database associated with the receiving application, transmitting the application data from the database associated with the sending application to the database associated with the receiving application.

12. The method of claim 10, further comprising, if the message ID matches the message ID previously stored in the database associated with the receiving application, transmitting a request to the sending application to not send the application data from the database associated with the sending application.

13. The method of claim 10, further comprising storing the message in a database associated with the sending application.

14. The method of claim 10, wherein determining a least one receiving application includes:
determining at least one logical receiving application according to the routing rules and based on the application data; and
determining an HTTP address of each of the logical receiving applications.

15. The method of claim 14, further comprising transforming the message from a format associated with the sending application to a format associated with the receiving application.

16. The method of claim 11, further comprising:
receiving the application data; and
storing the application data in a database associated with the receiving application.

17. The method of claim 16, further comprising executing the receiving application with the application data accessed from the database associated with the receiving application.

18. A system for reliably transporting a message from a sending application to a receiving application in a collaborative network, comprising:
a sender database associated with the sending application;
a first HTTP transport mechanism coupled to receive the message from the sending application and to store the message in the sender database;
a receiver database associated with the receiving application; and
a second HTTP transport mechanism coupled to receive the message from the first HTTP transport mechanism and to store the message in the receiver database;
wherein the second HTTP transport mechanism includes logic to determine whether a message has been previously received by the receiving application by examining a message identifier uniquely identifying the message, wherein the message is sent from the sending application to the receiving application using a first cycle including a first messaging and transport layer (MTL) at the sending application, using a second cycle at an integration server, coupled between the sending application and the receiving application, the second cycle including a second messaging and transport layer, and a third cycle including a third messaging and transport layer, each of the first, second, and third messaging and transport layers including a message queue, a physical address resolution, a database for storing the message identifier, and a transport mechanism for the HTTP request.

19. The system of claim 18, wherein the sender database and first HTTP transport mechanism are associated with a first server that hosts the sending application, wherein the receiver database and second HTTP transport mechanism are associated with a second server that hosts the receiving application, and wherein the second server is configured to act as an HTTP client for receiving the message.

* * * * *